(No Model.) 3 Sheets—Sheet 3.
A. O. DOWNS.
TRICYCLE.
No. 411,790. Patented Oct. 1, 1889.
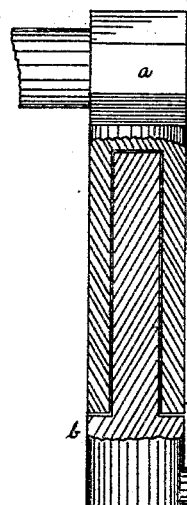
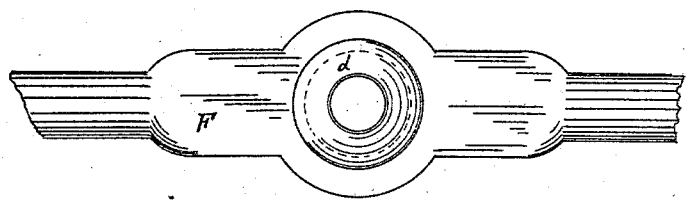
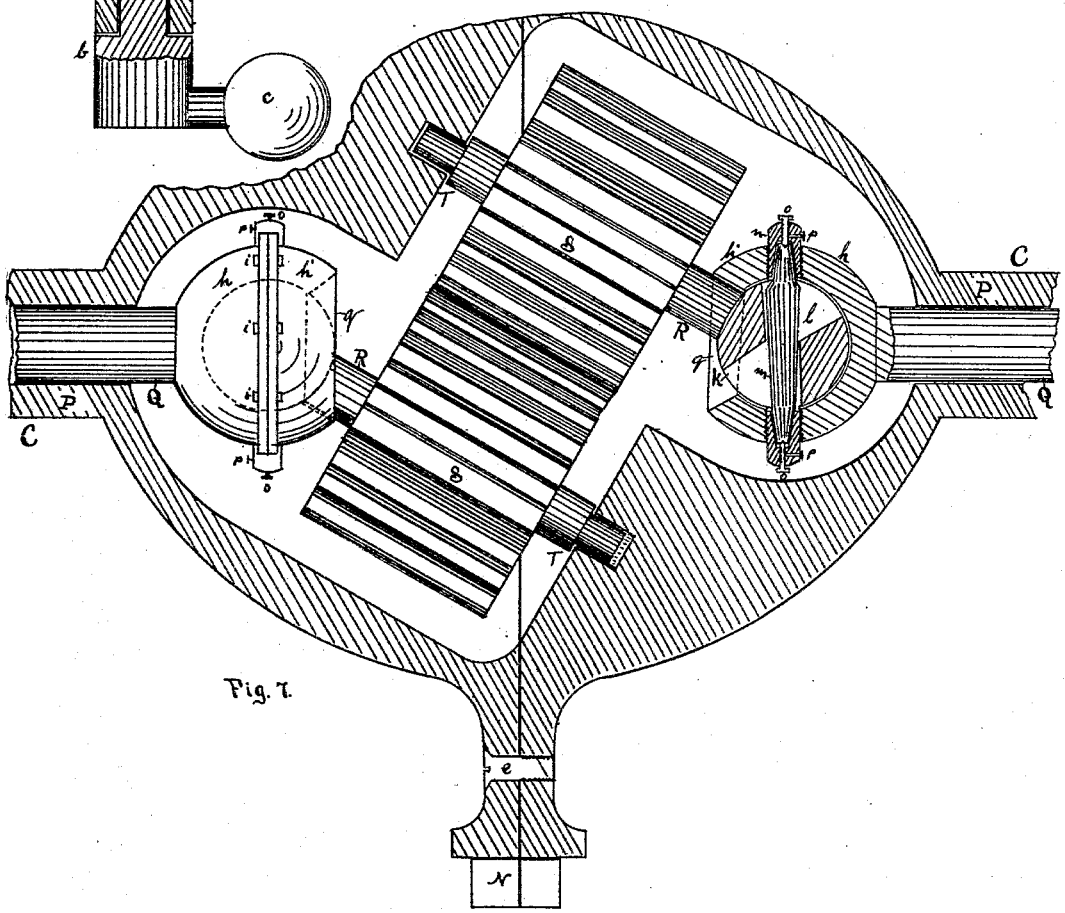
Witnesses
A. J. Feed
F. A. Diggins
Inventor
Allison O. Downs
Per A. G. Fuller
Attorney

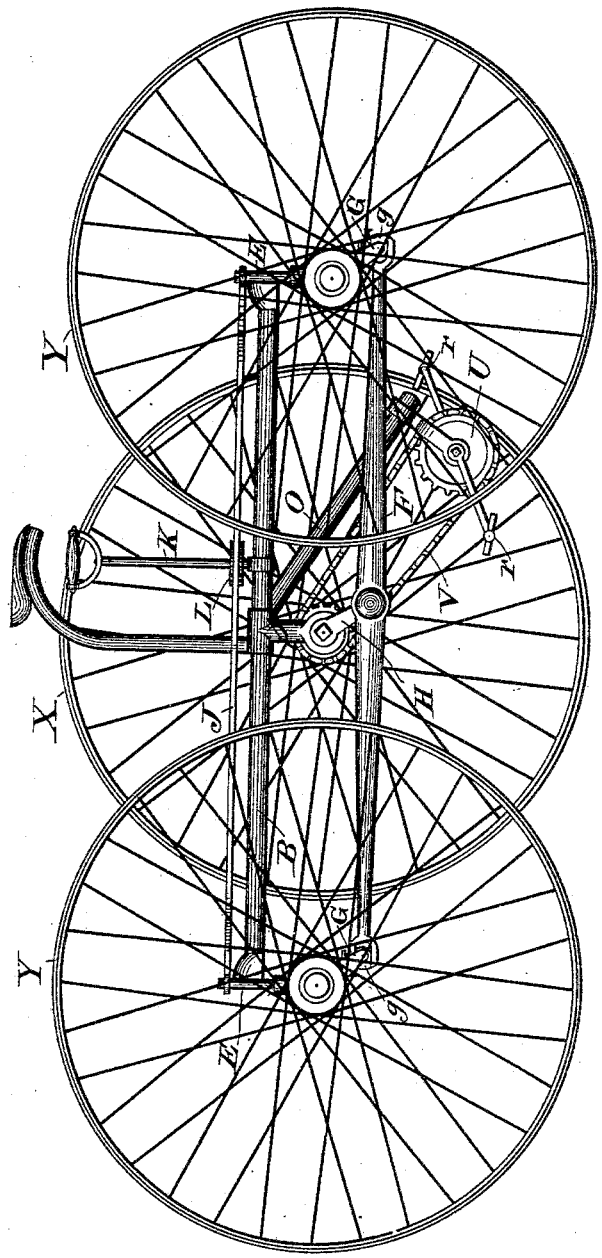

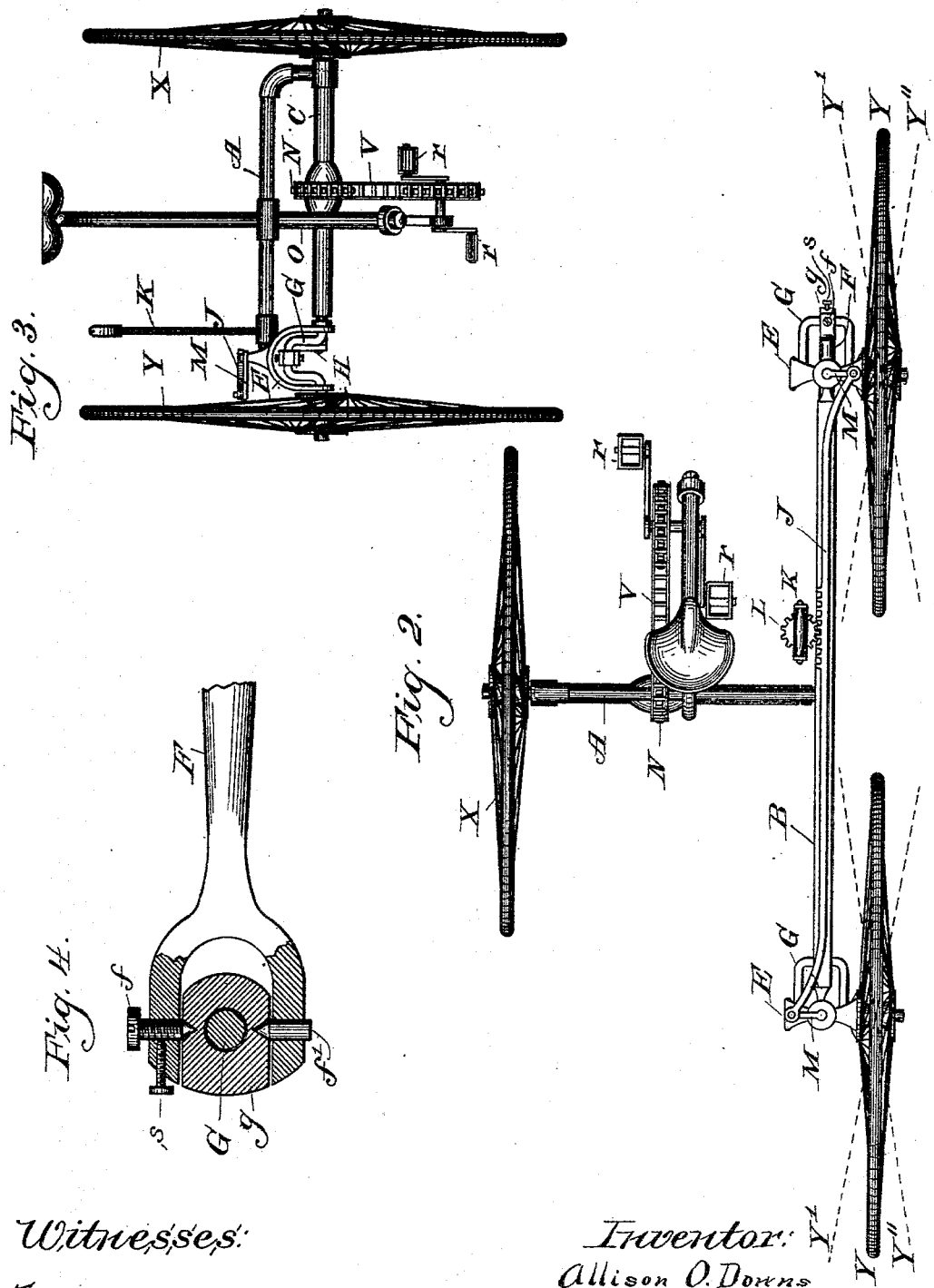

UNITED STATES PATENT OFFICE.

ALLISON O. DOWNS, OF CHARLEVOIX, MICHIGAN.

TRICYCLE.

SPECIFICATION forming part of Letters Patent No. 411,790, dated October 1, 1889.

Application filed February 25, 1889. Serial No. 301,159. (No model.)

*To all whom it may concern:*

Be it known that I, ALLISON O. DOWNS, a citizen of the United States, residing at Charlevoix, in Charlevoix county, State of Michigan, have invented a new and useful Tricycle, of which the following is a specification.

My invention relates to tricycles in which the three track-wheels are of equal size and are all driven by the direct application of power, and in which a compensating or differential gear is used, together with an arrangement of the track-wheels, (two being oscillating steering-wheels,) whereby the three wheels make but two tracks, the two steering-wheels following the same line in motion either in a straight line or curve, and in which the steering-wheels are deflected simultaneously in opposite directions and equal degrees in motion upon a curve.

The objects of my invention are, first, to provide for the direct application of power to each of the three track-wheels; second, to provide an improved compensating or differential gear to allow the necessary retardation of motion in the inner track-wheel in curving; third, to provide suitable mechanism for simultaneously deflecting the steering-wheels in opposite directions and equal degrees in curving. I attain these objects by means of the mechanism illustrated in the accompanying drawings, which are hereby made a part of this specification, in which—

Figure 1 is an elevation of my tricycle from the right side. Fig. 2 is a plan view from above. Fig. 3 is an elevation from the front. Fig. 4 is a cross-section detail of the end of the driving-rod connecting the steering track-wheels, showing its attachment to the axles of those wheels. Fig. 5 is a detail of a telescopic crank, through which power is transmitted to the connecting-rod. Fig. 6 is a detail of the connecting-rod at its joint with the telescopic crank. Fig. 7 is a view of my compensating or differential gear, in part cross-section, so as to show the method of construction of the universal joint used therein.

In the drawings like letters refer to like parts.

My improved tricycle is constructed in the following manner, viz:

I provide a rigid frame of the pieces A, B, D, and O, as shown in Figs. 1, 2, and 3. This is preferably composed of tubing, that it may be both light and strong. B, as shown in Figs. 1 and 2, joins pivotally at either end with the forked steering-heads E E. A is rigidly joined to the center of B at one end, while the other bends downward at right angles, and is provided with a suitable ball-bearing journal-box adapted to receive the axle of the wheel X, as shown in Fig. 3.

D is a short piece rigidly attached to A at its upper end, and provided at its lower end with a journal-box, corresponding in all respects to the one at the end of A.

The track-wheel X is rigidly fixed to one end of the axle or shaft C, which passes through the journals in A and D, and at the other end has solidly attached to it the section *a* of the telescopic crank-arm H. C is also broken into sections in the middle by the compensating or differential gear contained in the driving-pulley N. The steering-heads E E at either end of B are ordinary steering-forks of any convenient shape and are provided at the ends of the forks with ball-bearing journal-boxes adapted to receive the crank-axles G G of the steering track-wheels Y Y, which are rigidly attached thereto at their outer ends. Connecting the axles G G is a driving-rod F, attached to said axles by means of a universal joint, formed substantially as in Fig. 4, by having a suitable journal-box *g*, preferably a ball-bearing one, inclose the axle G. To the outside of this case *g*, by a suitable vertical pivotal attachment, the rod F is joined, the end being forked for the purpose, as shown. I prefer the mechanism shown in Fig. 4, where the attachment of F is made by means of the vertical pins *f* and *f'*, the pin *f* being provided with a screw-thread for the purpose of adjustment, &c., it also being locked in any convenient manner, as by the set-screw *s*. This joint allows a complete and free revolution of the axle G, and at the same time any necessary deflection of F from a plane perpendicular to the axles G when the steering-wheels are deflected in curving.

The driving-crank H is made in two telescopic sections *a* and *b*, as shown in Fig. 5, the section *a*, as above said, being attached to C and the section *b* being journaled, by means of a globe-bearing *c*, in the rod F. The two sections of H are made to work smoothly upon each other. This telescopic construction with the globe-bearing permits the necessary torsion and travel in the crank H as the rod F is deflected from side to side in curving. At the center of F, as shown in Fig. 6, is a spherical journal-box adapted to receive the globe $c$. This consists of a hemispherical depression in F, into which screws a hemispherical cap $d$, provided with an aperture for the short shaft connecting the globe $c$ with $b$.

The driving-shaft C, as above indicated, is separated into sections by the compensating or differential gear consisting of the mesh or friction-wheels S S on the short shafts R R. These connect with the two sections of the main shaft or axle C, or that portion of it marked Q, Fig. 7, by means of spherical universal joints consisting of the globe-bearing $k$, attached to or forming the end of R. $k$ is perforated in a plane in the axis of R by the double-V-shaped slot $l$, the opening at the center being sufficient to allow the passage of the pin or key $m$. $l$ is tapered also laterally to fit $m$, as below described. The globe $k$ is journaled in a spherical journal-box of the sections $h$ and $h'$. $h$ is a part of or is attached to the end of Q. $h'$ is provided with with a circular aperture $q$ of any desired area for the passage and oscillatory rotation of R.

The sections $h$ and $h'$ are fastened together in any suitable manner by screwing the one into the other, or by the bolts or screws $i\ i$.

The pin $m$ is rectangular in section in that portion of it passing through $k$ and tapers from one end on two sides to allow for adjustment for wear. The ends of $m$ are conical, and are pivotally engaged by the caps $n\ n$, which are screwed into the spherical journal-box. Through the ends of the caps and pivotally engaging the ends of the pin $m$, for the purpose of adjustment, are the set-screws $o\ o$, which may be locked in any suitable manner—as by the screws $p\ p$. The shafts Q Q are journaled in the sleeved extensions P P of the chain-pulley N, in which the compensating gear is placed.

The entire shaft C, and thereby, by means of the connecting-rod F, all three track-wheels, is driven by power developed by the feet of the rider acting upon the treadles $r\ r$ and transmitted by means the chain-pulley U and the driving-chain V to the chain-pulley N.

The steering mechanism consists of the short steering-arms M M, rigidly attached to the steering-heads E E in line with the axles G G, but upon opposite sides from each other.
These are connected by the rod J, which has at or near its center a portion provided with ratchet-teeth adapted to be engaged by the corresponding teeth of the wheel L, from which rises a solidly-attached rod or standard K, provided at its upper end with any convenient handle. The wheel L, by means of the standard K, is, by any suitable mechanism allowing rotation, attached to the piece B of the frame. By rotating the wheel L by means of the connecting-rod attached to the arms M M the steering forks or heads E E are simultaneously deflected in opposite directions, and thereby the axles G G and the steering track-wheels Y Y, as shown in Fig. 2, where the dotted lines Y′ Y′ and Y″ Y″ show the corresponding positions assumed by Y Y when thus deflected as in curving.

I am aware that there are tricycles now in use with the three track-wheels so arranged that they make but one track. I therefore disclaim any novelty of invention in this regard.

I am also aware that in tricycles now made a compensating or differential gear is used in all respects similar to mine and for the same purpose as in the drawings illustrated and herein described, except as to the use of the spherical universal joint above described. I therefore disclaim all novelty of invention in said compensating gear except as to the use of said spherical universal joint; and I am also aware that in tricycles now in use, where the steering track-wheels are placed in line and directly beneath the center of the steering-forks a similar steering mechanism is used, and therefore, except as to its use in deflecting the steering-wheels when placed outside the steering-forks and used simultaneous as steering and driving wheels, I disclaim any novelty of invention.

Having thus described my invention so that any one skilled in the manufacture and use of tricycles or similar vehicles may be able to build it, what I claim as novel, and desire to secure by Letters Patent, is—

1. A tricycle having a frame composed of the pieces A, B, D, and O, a driving mechanism consisting of a driving-shaft C, separated into two sections by a compensating or differential gear in which a spherical universal joint is used, said driving-shaft C having the track-wheel X solidly attached to one end and the section $a$ of the telescopic crank-arm H to the other, a telescopic crank H, composed of the sections $a$ and $b$, the section $b$ being provided with a spherical or globe bearing $c$, and thereby attached to the connecting-rod F, a connecting-rod F, communicating with the shaft C by means of the telescopic crank-arm H, said rod F being provided with a spherical journal-box to receive the globe-bearing $c$, and being connected pivotally at either end with a journal-box or ball-bearing journal-case $g$, inclosing the crank-axles G G, crank-axles G G, journaled in the steering-forks E E and having solidly attached to them outside of E E the steering track-wheels Y Y, three track-wheels of equal diameter X and Y Y being respectively solidly attached to the shaft C and the axles G G, all being driven, a steering mechanism consisting of the arms M M, solidly attached to the steering-forks E E, but extending in opposite directions, the rod J, connecting said arms, and the steering-standard K, solidly attached to the ratchet-wheel L, which is adapted to engage a ratchet-face upon J, all substantially as and for the purpose above specified.

2. In a tricycle, three track-wheels of equal diameter X and Y Y, the wheels Y Y being also steering-wheels, and all being adapted to be driven by means of the shaft C, the crank H, and the connecting-rod F, substantially as and for the purpose above specified.

3. In a tricycle, the use of a connecting-rod F, pivotally attached to journal-boxes or ball-bearing cases $g$ $g$, which inclose the journals of the axles G G, and provided with a spherical journal-box $d$, adapted to receive the globe-bearing $c$, substantially as and for the purpose above specified.

4. In a tricycle, a universal-joint connection between the rod F and the axles G G, consisting of the forked ends of F, fastened pivotally to the journal-boxes or ball-bearing cases $g$ $g$ by the pins $f$ and $f'$ at right angles to the axles G G, the pin $f$ having a screw-thread and adapted to be locked in any suitable manner, as by the set-screw $r$, the journal-boxes $g$ $g$, adapted to inclose the axles G G, adapted to receive the ends of the pins $f$ and $f'$, substantially as and for the purpose above specified.

5. In a tricycle, the combination of the connecting-rod F, the universal joint formed by the pivotal connection of F with the journal-box $g$, the steering-forks E E, and the steering track-wheels Y Y, substantially as and for the purpose above specified.

6. A telescopic crank H, consisting of the sections $a$ and $b$, $b$ having a globe-bearing $c$, substantially as and for the purpose specified.

7. In a tricyle, the combination of the shaft C, the telescopic crank H, and the connecting-rod F, as and for the purposes above specified.

8. A spherical universal joint consisting of the spherical journal $k$, perforated by the double-V-shaped slot $l$ in the axis of the shaft R, adapted to receive and work upon the pin $m$, the pin $m$ rectangular in section and tapering from end to end with conical sections at either end, adapted to be journaled in the caps $n$ $n$ and adjusted by the set-screws $o$ $o$, the spherical journal-box of sections $h$ and $h'$, $h$ being attached to the shaft Q and $h'$ being provided with an aperture $q$ of any desired diameter, the two sections $h$ and $h'$ being adapted to be fastened together, as by bolts or screws $i$ $i$, with a compensating or differential gear consisting of the mesh or friction gears S S, or equivalents, upon a secondary shaft R, journaled at one end in fixed journal-boxes T and connecting with a main shaft Q, substantially as and for the purpose above specified.

ALLISON O. DOWNS.

In presence of—
  HORACE S. HARSHA,
  JOHN BURNS.